United States Patent
Mehta et al.

(10) Patent No.: US 9,483,156 B2
(45) Date of Patent: Nov. 1, 2016

(54) SELECTIVELY BROADCASTING AUDIO AND VIDEO CONTENT

(71) Applicant: Apple Inc., Cupertino, CA (US)

(72) Inventors: Sarin S. Mehta, Cupertino, CA (US); Varun A. Vora, San Jose, CA (US); Ioan V. Uilecan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 324 days.

(21) Appl. No.: 14/191,245

(22) Filed: Feb. 26, 2014

(65) Prior Publication Data

US 2015/0242062 A1    Aug. 27, 2015

(51) Int. Cl.
  *G06F 13/00* (2006.01)
  *G06F 3/0481* (2013.01)
  *G06F 3/0484* (2013.01)
  *H04L 29/08* (2006.01)
  *H04L 29/06* (2006.01)

(52) U.S. Cl.
  CPC .......... *G06F 3/0481* (2013.01); *G06F 3/04842* (2013.01); *H04L 65/4076* (2013.01); *H04L 67/141* (2013.01)

(58) Field of Classification Search
  CPC .............................. G06F 9/4443; G06Q 10/10
  USPC .................................. 715/751, 753; 719/329
  See application file for complete search history.

(56) References Cited

U.S. PATENT DOCUMENTS

| | | | |
|---|---|---|---|
| 7,046,134 B2 | 5/2006 | Hansen | |
| 8,347,395 B2 | 1/2013 | Fischer | |
| 8,495,660 B1 | 7/2013 | Hernacki | |
| 2006/0002315 A1* | 1/2006 | Theurer | G06F 3/0481 370/261 |
| 2006/0161853 A1* | 7/2006 | Chen | G06Q 10/10 715/758 |
| 2011/0181492 A1 | 7/2011 | Soeda | |
| 2013/0019186 A1* | 1/2013 | Lance | G06Q 50/01 715/753 |
| 2015/0032686 A1* | 1/2015 | Kuchoor | G06F 17/241 707/608 |
| 2015/0046834 A1* | 2/2015 | Wu | H04L 51/04 715/748 |

* cited by examiner

Primary Examiner — Andy Ho

(57) ABSTRACT

Disclosed herein is a technique for selectively broadcasting content to a destination device. An operating system (OS) executing on a source device is configured to generate an OS user interface (UI) and execute a plurality of applications, where each application of the plurality of applications is configured to generate a respective application UI. The source device receives a selection of a broadcast profile that identifies at least one application of the plurality of applications whose respective application UI should not be displayed at the destination device. In response to receiving the selection, a configuration of the source device is updated to cause: 1) the OS UI, but not the application UI associated with the at least one application, to be broadcasted to the destination device, and 2) the OS UI, as well as the application UI associated with the at least one application, to be displayed at the source device.

14 Claims, 13 Drawing Sheets

SELECTIVELY BROADCASTING AUDIO AND VIDEO CONTENT

FIELD

The described embodiments set forth a technique for selectively broadcasting audio and video content from a portable computing device to an auxiliary display.

BACKGROUND

Portable computing devices (e.g., laptops and smart phones) are commonly being used to broadcast content to auxiliary displays (e.g., projectors and televisions). A common use-case scenario involves a user loading a slideshow presentation onto his or her portable computing device, connecting the portable computing device to an auxiliary display, and then causing the portable computing device to output the slideshow presentation to the auxiliary display. Various interfaces can be used to connect portable computing devices to auxiliary displays, including Digital Visual Interface (DVI) cables and High-Definition Multimedia Interface (HDMI) cables. More recently, however, network-based interfaces are being implemented and enable users to share their content on nearby auxiliary displays through local networks (e.g., a WiFi network). One example of a network-based interface includes Apple's® AirPlay®, which enables AirPlay®-equipped portable computing devices (e.g., iOS-based devices such as iPhones® and iPads®) to broadcast content to AirPlay®-equipped components (e.g., Apple TVs®).

Although the foregoing approaches provide a convenient mechanism for individuals to share their content with others, privacy concerns unfortunately continue to be a problem. For example, when a user "mirrors" his or her iPhone® to an auxiliary display, the entire user interface displayed on the iPhone® is replicated at the auxiliary display and can be seen by others. Oftentimes, when being mirrored, the iPhone® continues to receive and display personal data (e.g., text messages), which can be problematic for the user (e.g., when sharing a slideshow presentation with his or her colleagues at work). One approach commonly taken by users to reduce privacy exposure involves manually closing applications and disabling notifications prior to broadcasting content to auxiliary displays, but this is a cumbersome and inefficient process. Moreover, the typically large number of applications that execute on portable computing devices makes it difficult for users to cover all potential avenues of privacy exposure.

SUMMARY

Representative embodiments set forth herein disclose various techniques for enabling a user to selectively broadcast audio and video content from a computing device to an auxiliary display. In particular, the techniques involve enabling the user to create one or more "broadcast profiles," where each broadcast profile, when applied at the computing device, sets forth a particular manner in which the computing device broadcasts content to the auxiliary display. Notably, each broadcast profile can be associated with one or more triggers that can be used to automatically select the broadcast profile to be applied when certain conditions are met. Alternatively, these triggers can be used to prioritize the broadcast profile when presenting a list of available broadcast profiles to a user for selection. In this manner, the user is able to establish a variety of configurations that can be used to share content with others while reducing or eliminating overall privacy exposure. Moreover, the user is not required to forego viewing the content that is not broadcasted to the auxiliary display (e.g., notifications), since he or she can continue to view this content locally at the computing device (e.g., via a local display connected to the computing device).

One embodiment sets forth a method for selectively broadcasting content from a source device to a destination device. In particular, the source device is configured to execute an operating system (OS), and the OS is configured to generate an OS user interface (UI) and execute a plurality of applications, where each application of the plurality of applications is configured to generate a respective application UI. The source device is further configured to carry out steps that include receiving a request to broadcast the OS UI to the destination device, and receiving a selection of a broadcast profile, where the broadcast profile identifies at least one application of the plurality of applications whose respective application UI should not be displayed at the destination device. Moreover, the source device is configured to, in response to receiving the selection, update a configuration of the source device to cause: the OS UI, but not the application UI associated with the at least one application, to be broadcasted to the destination device, and the OS UI, as well as the application UI associated with the at least one application, to be displayed at the source device.

Another embodiment sets forth a non-transitory computer readable storage medium configured to store instructions that, when executed by a processor included in a computing device, cause the computing device to carry out a series of steps. In particular, the steps include generating a first user interface (UI) and a second UI, where the second UI is displayed within the first UI, receiving a request to broadcast the first UI to a destination device, and receiving a selection of a broadcast profile that defines a manner in which the second UI is to be broadcasted to the destination device. The steps further include displaying, at the computing device and based on the broadcast profile, both the first UI and the second UI, and broadcasting, to the destination device, only the first UI.

Yet another embodiment sets forth a system configured to selectively broadcast content to a destination device. The system includes a processor and a memory, where the memory is configured to store instructions that, when executed by the processor, cause the system to carry out a series of steps. In particular, the steps include generating a first user interface (UI) and a second UI, where the second UI is displayed within the first UI, receiving a request to broadcast the first UI to the destination device, and receiving a selection of a broadcast profile that defines a manner in which the second UI is to be broadcasted to the destination device. The steps further include displaying, at the system and based on the broadcast profile, both the first UI and the second UI, and broadcasting, to the destination device, only the first UI.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1A:
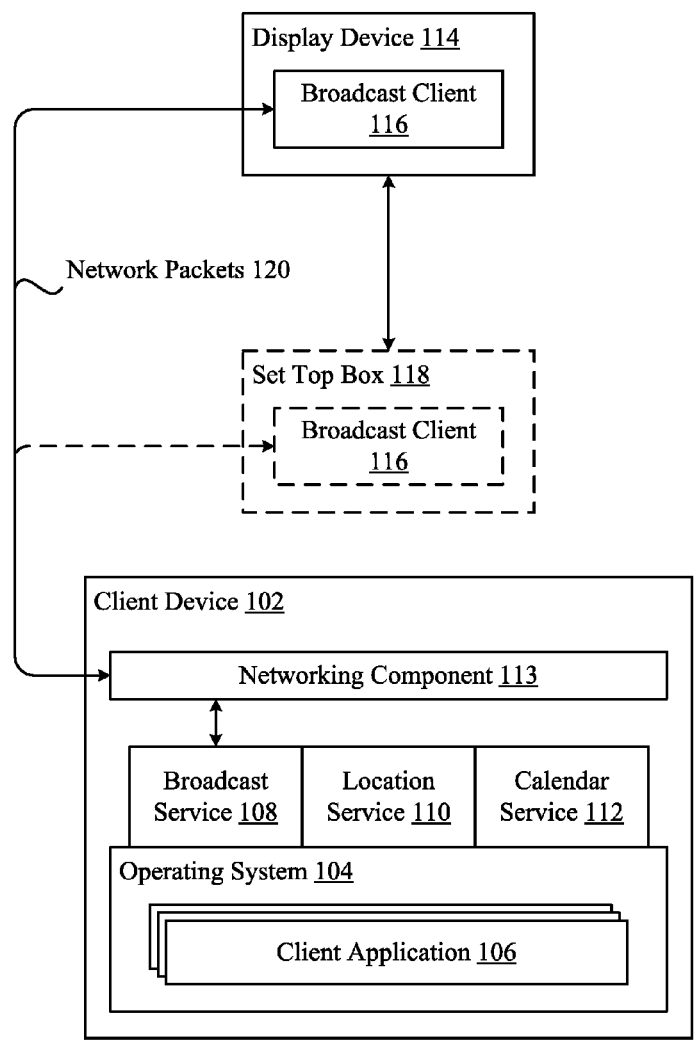
FIGS. 1A-1B illustrate block diagrams of different components of a system configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Disclosed herein are various techniques for enabling a user of a source device to selectively broadcast content—such as one or more application user interfaces (UIs)—from the source device to a destination device. Examples of the source device can include (but are not limited to) a desktop computer, a laptop computer, a smart phone, or any electronic device that is capable of broadcasting content to the destination device. According to popular configurations, the source device can be configured to broadcast the content to the destination device via a local display port (e.g., an HDMI port) or via a network-based protocol (e.g., Apple's® AirPlay®) that is supported by both the source device and the destination device. Notably, however, the techniques described herein can be applied to any source device that is capable of broadcasting content, via any means, to a destination device. Examples of the destination device can include (but are not limited to) a set top box, a smart television, or any electronic device that is capable of receiving and processing content (i.e., displaying the content locally or outputting the content for display). According to one embodiment, the source device can configured to automatically detect a connectivity presence of the destination device (e.g., when the source device is connected to the destination device via a display cable or via a network connection).

When a connectivity presence is detected, the source device can be configured to identify one or more broadcast profiles that can be used to control the manner in which the source device broadcasts content from the source device to the destination device. In one embodiment, each broadcast profile lists at least one application and sets forth whether content (e.g., UI data and audio data) generated by the at least one application should be broadcasted to the destination device. In some embodiments, when an applied broadcast profile lists only a subset of applications that are included on the source device, the source device treats the excluded applications as applications whose content should not be broadcasted to the destination device. In this manner, a user of the source device, when configuring broadcast profiles, is not imposed with the tedious task of setting forth preferences for each and every one of the applications that are included on the source device. According to some embodiments, the source device can be configured to automatically select a broadcast profile that is most appropriate and apply the broadcast profile without requiring a selection from the user. In this manner, the user is not imposed with the task of manually selecting a broadcast profile any time he or she desires to share content. Moreover, the source device can be configured to track the manner in which the user selects different broadcast profiles to learn the user's preferences and become able to preempt his or her selections.

In some embodiments, each broadcast profile can include one or more triggers that prioritize the broadcast profile when performing an automatic selection or when displaying a list of broadcast profiles to the user for selection. According to one embodiment, each trigger can be associated with one or more properties that cause the trigger to transition from an inactive state to an active state. One example of a trigger is a geographical trigger that defines one or more geographical areas. In particular, the geographical trigger can be configured to enter into an active state when the source device is located within at least one of the one or more geographical areas. Another example of a trigger is a destination device trigger that defines one or more known destination devices. In particular, the destination device trigger can be configured to enter into an active state when the source device detects a connectivity presence of at least one of the one or more known destination devices. Yet another example of a trigger is a calendar category type trigger that defines one or more calendar category types. In particular, the calendar category trigger can be configured to enter into an active state when at least one of the one or more calendar category types matches a calendar category type of a contextually-relevant calendar entry (e.g., a calendar entry whose timespan overlaps a time at which the calendar category trigger is processed). Notably, the examples of triggers described herein are not meant to be an exhaustive list, but rather represent different types of triggers that can be implemented. Other triggers that are within the scope of the embodiments described herein can be based on virtually any input that can be received at the source device and processed against different conditions specified by the triggers.

Accordingly, the foregoing approaches provide techniques for selectively controlling how content is transmitted from a source device to a destination device. These techniques provide the advantage of enabling a user of the source device to view private content (e.g., notifications relating to personal messages) on the source device while simultaneously sharing public content (e.g., a slideshow presentation) on the destination device. A more detailed discussion of these techniques is set forth below and described in conjunction with FIGS. 1A-1B, 2-3, 4A-4F, 5A-5B, and 6, which illustrate detailed diagrams of systems and methods that can be used to implement these techniques.

FIG. 1A illustrates a block diagram of different components of a system 100 configured to implement the various techniques described herein, according to some embodiments. More specifically, FIG. 1A illustrates a high-level overview of the system 100, which, as shown, includes a client device 102, a display device 114, and an optional set top box 118. According to the configuration illustrated in FIG. 1A, the client device 102 can represent any computing device that is capable of broadcasting content (as network packets 120) to the set top box 118, or directly to the display device 114. Examples of the client device 102 can include computing devices that implement Apple's® Airplay® technology, such as iOS-based devices (e.g., Apple® iPads®) and Mac OS X®-based devices (e.g., Apple® MacBook Pros®). The set top box 118 and the display device 114 can represent any electronic device that is capable of receiving and processing the broadcast content (as network packets 120). Examples of the set top box 118 can include electronic devices that implement Apple's® Airplay® technology (e.g., Apple TVs®) and are, in most cases, configured to output the content to a display device (e.g., via an HDMI cable) that is not capable of directly implementing Apple's® Airplay® technology. Alternatively, examples of the display device 114 can include any display device that is capable of directly implementing Apple's® Airplay® technology, which, in some cases, can render the set top box 118 as being an optional component within the system 100.

As shown in FIG. 1A, the client device 102 can be configured to execute an operating system 104 (e.g., Apple's® iOS operating system), where the operating system 104 is configured to manage various hardware resources included in the client device 102 and to execute a variety of software applications and services. Examples of the software applications include client applications 106, which can represent, messaging, email, media applications, etc., that are configured to be executed by the operating system 104. Examples of the software services include a broadcast service 108, a location service 110, and a calendar service 112, which, as described in greater detail below, are configured to provide a variety of features for implementing the various techniques described herein.

Figure 1B:
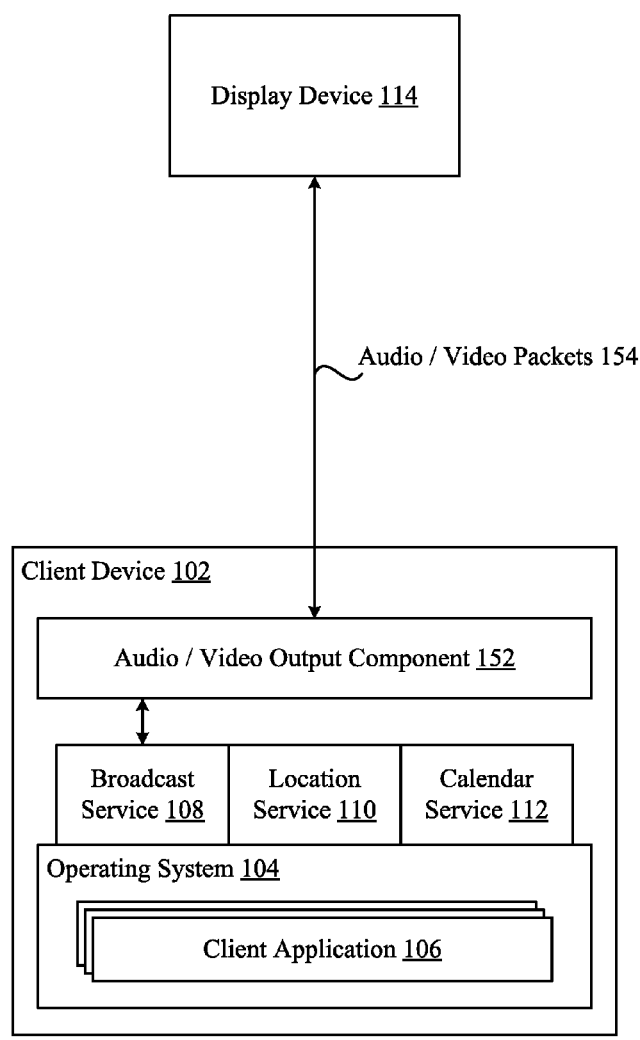

The broadcast service 108 can be configured to manage various broadcast profiles and selectively broadcast content to the set top box 118 or display device 114 based on a selected broadcast profile. According to the embodiment illustrated in FIG. 1A, the broadcast service 108 can be configured to manage network-based connectivity to destination devices—such as the set top box 118 (via the broadcast client 116) and the display device 114—by interfacing with a networking component 113 (e.g., a WiFi card). In particular, the networking component 113 can represent any component that is capable of establishing connectivity to a network and communicating with other devices that are connected to the network. In an alternative embodiment illustrated in FIG. 1B, the broadcast service 108 can be configured to directly interface with destination devices via an audio/video output component 152. In particular, the audio/video output component 152 can represent any component that is capable of interfacing with a destination device (e.g., the display device 114) via a wired or wireless audio/video connection (e.g., an HDMI port, a high-definition wireless video interface, etc.) through which audio/video packets 154 are transmitted. Notably, although FIG. 1A and FIG. 1B show different embodiments, the client device 102 can be configured to incorporate both the networking component 113 and the audio/video component 152 in order to provide more connection flexibility to the user. Moreover, and as previously set forth above, the scope of the embodiments described herein considers any known means that can be implemented to enable the client device 102 to broadcast content to the set top box 118 and/or the display device 114.

As noted above, the operating system 104 can be configured to include the location service 110. According to one embodiment, the location service 110 can be configured to manage and provide to the broadcast service 108 location data that is associated with the client device 102. In particular, and as described in greater detail below, a present location of the client device 102 can be used by the broadcast service 108 to identify broadcast profiles that include geographical triggers that are associated with the present location of the client device 102. As also noted above, the operating system 104 can further be configured to include the calendar service 112, which can be configured to manage and provide to the broadcast service 108 calendar data that is associated with a user of the client device 102. In particular, and as described in greater detail below, the broadcast service 108 can be configured to identify broadcast profiles that include calendar category type triggers. More specifically, each calendar category type trigger sets forth one or more calendar category types that can potentially match a calendar category type of a contextually-relevant calendar entry (e.g., a calendar entry whose timespan overlaps a time at which the calendar category type trigger is processed).

Figure 2:
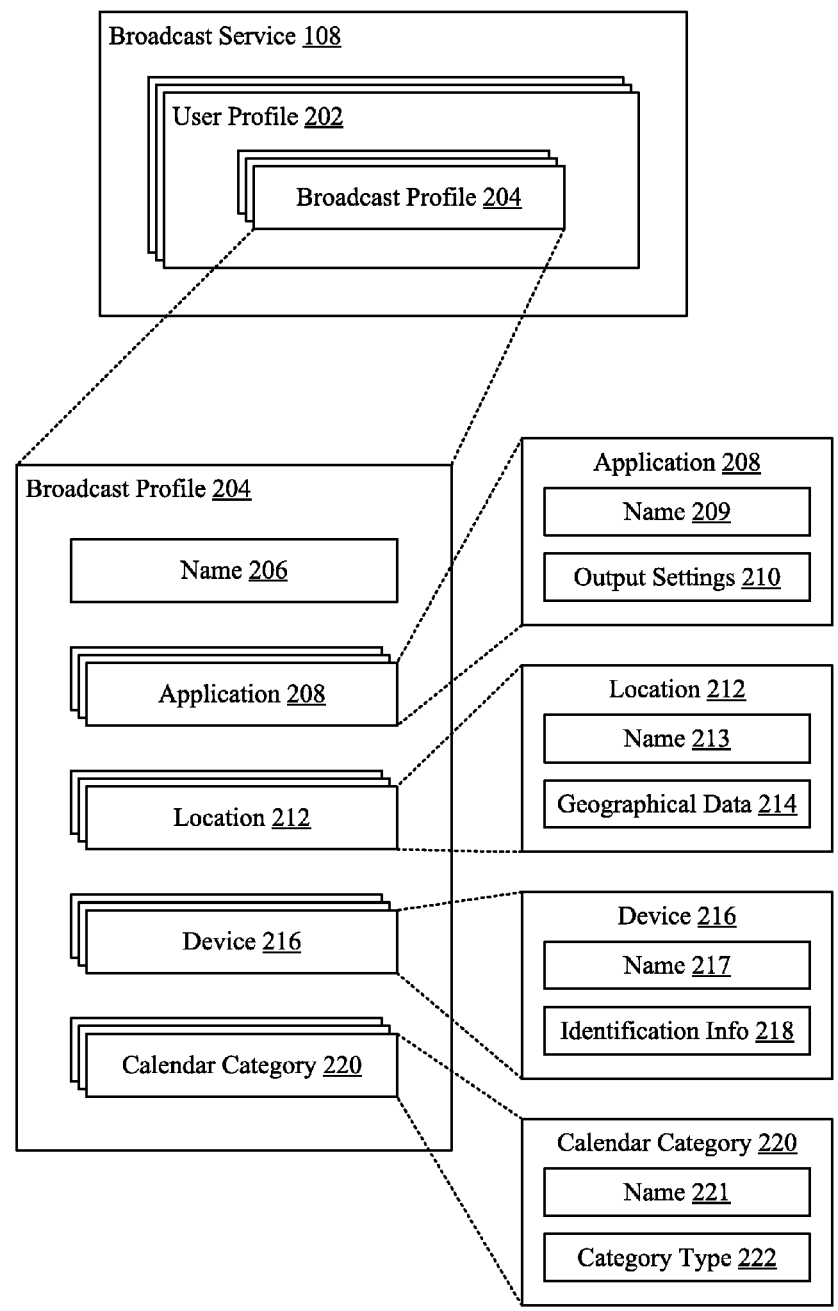
FIG. 2 illustrates a block diagram of detailed view of a particular software component included in FIGS. 1A-1B, according to one embodiment.

FIG. 2 illustrates a block diagram of detailed view 200 of the broadcast service 108 of FIG. 1, according to one embodiment. As shown in FIG. 2, the broadcast service 108 can manage, for one or more user profiles 202 of the client device 102, information about one or more broadcast profiles 204. In particular, each broadcast profile 204 can include a name 206 that can be used to denote a particular use-case for the broadcast profile 204, e.g., "Work" for an office-based broadcast profile 204 that is configured to enable only a single application to be broadcasted to a destination device, or "Home" for a home-based broadcast profile 204 that is configured to enable all applications to be broadcasted to a destination device, and the like. As also shown in FIG. 2, each broadcast profile 204 can also include information about one or more applications 208, where each application 208 is associated with a name 209 and output settings 210. In particular, the name 209 can be used to denote a name of the application 208, e.g., "Music" for a media playback application, and the output settings 210 can be used to denote how different types of information produced by the application 208 should be broadcasted to a destination device. As described in greater detail below in conjunction with FIG. 3, the types of information can include, but are not limited to, audio and video (e.g., a UI) produced by the application 208. For example, the types of information can be expanded to include various types of notifications that the application is capable of generating.

As also shown in FIG. 2, each broadcast profile 204 can be configured to include information that comprises different types of triggers that apply to the broadcast profile 204. For example, each broadcast profile 204 can include information about one or more locations 212, where each location 212 is associated with a name 213 and geographical data 214. In particular, the name 213 can be used to denote a nickname for a particular geographical area that is covered by the geographical data (e.g., the name of an office complex), and the geographical data 214 can be used to identify the particular geographical area. For example, the geographical data 214 can include one or more latitude and coordinates, and various other types of geographical data to establish a particular geographical area to which the associated location 212 applies. As also shown in FIG. 2, each broadcast profile 204 can include information about one or more devices 216, where each device 216 is associated with a name 217 and identification information 218. In particular, the name 217 can be used to describe a particular destination device to which content can be broadcasted (or to which content was previously broadcasted), e.g., "Home TV", and the identification information 218 can be used to reference the particular destination device. For example, the identification information 218 can include hardware information associated with the particular destination device, network address information associated with the device, and/or any other information that can be used to identify the particular destination device.

As further shown in FIG. 2, each broadcast profile 204 can include information about one or more calendar categories 220, where each calendar category 220 is associated with a name 221 and a category type 222. In particular, the name 221 can be used to denote a nickname for the category type 222, e.g., "Office Meeting", and the category type 222 can represent information that is known to the calendar service 112, e.g., an index code of "4" that represents an index for an array of calendar category types maintained by the calendar service 112.

Accordingly, and as described in greater detail below, the various triggers included within each broadcast profile 204—such as the locations 212, the devices 216, and the calendar categories 220—can be used to identify a relevance of the broadcast profile 204 when the triggers are processed by the broadcast service 108, which can then be used to prioritize each of the broadcast profiles 204 for selection (either automatically, or manually by a user). As previously noted herein, the various information that can be included in each broadcast profile 204 is not limited to the foregoing descriptions set forth in conjunction with FIG. 2. Instead, each broadcast profile 204 can also be configured to include any information that is relevant to prioritizing and/or automatically selecting the broadcast profile 204.

Figure 3:
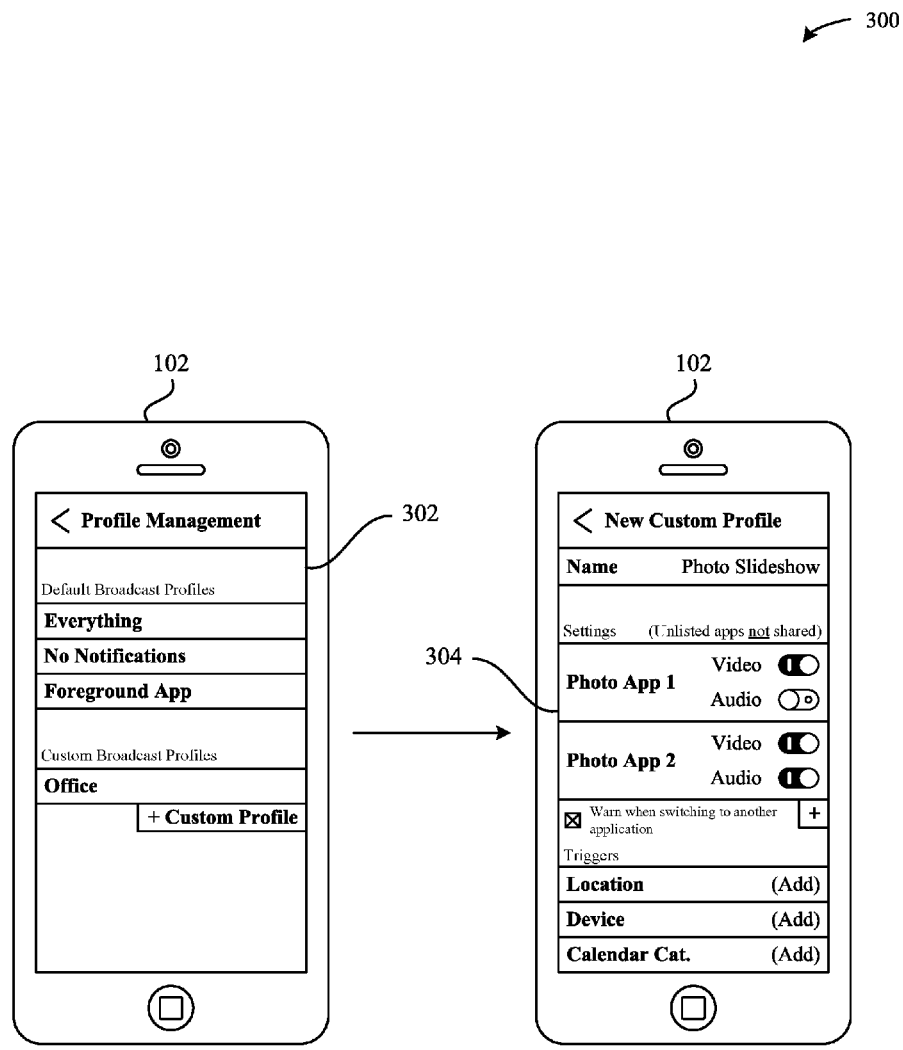
FIG. 3 illustrates a conceptual diagram that includes examples of user interfaces that can be used to manage various broadcast profiles, according to one embodiment.

FIG. 3 illustrates a conceptual diagram 300 that includes examples of user interfaces that can be utilized by a user to manage various broadcast profiles 204, according to one embodiment. According to the illustration shown in FIG. 3, the client device 102 is configured to display a user interface 302 for managing various broadcast profiles 204, which, as shown, includes three default profiles named "Everything", "No Notifications", "Foreground App", and one previously-established custom profile named "Office". As shown in FIG. 3, the user interface 302 enables a user to edit the existing broadcast profiles 204, as well as generate new (custom) broadcast profiles 204 via a user interface 304. Specifically, the user interface 304 enables the user to establish information that comprises a new broadcast profile 204—including a name (i.e., the name 206 of FIG. 2) for the new broadcast profile 204, various applications (i.e., the applications 208 of FIG. 2) and their content broadcast settings, miscellaneous settings, and various triggers (i.e., the locations 212, the devices 216, and the calendar categories 220 of FIG. 2). In the example shown in FIG. 3, the user chooses the name "Photo Slideshow" for the new broadcast profile 204 and selects the applications named "Photo App 1" and "Photo App 2". Next, the user specifies the manner in which content—including audio and video—generated by each of these applications is to be broadcasted to a destination device. The user also opts to be warned when he or she attempts to switch to any other application on the client device 102 that is not included in the list of applications displayed within the user interface 304.

The user interface 304 also enables the user to add a location 212 to the new broadcast profile 204, whereupon he or she can select from pre-established geographical areas (maintained by location service 110), or generate a new geographical area that applies to the new broadcast profile 204. In another example, the user can opt to add a device 216 to the new broadcast profile 204, whereupon he or she can select from available destination devices and/or destination devices to which content was previously broadcasted. In yet another example, the user can opt to add a calendar category 220 to the new broadcast profile 204, whereupon he or she can select from different calendar category types that are maintained by the calendar service 112. Notably, the user interface 302 and the user interface 304 are meant to be examples of user interfaces that the broadcast service 108 can be configured to generate, but the embodiments described herein are not so limited. Instead, the broadcast service 108 can be configured to produce any user interface that enables a user to input and manage various types of information that can comprise a broadcast profile 204.

Figure 4A:
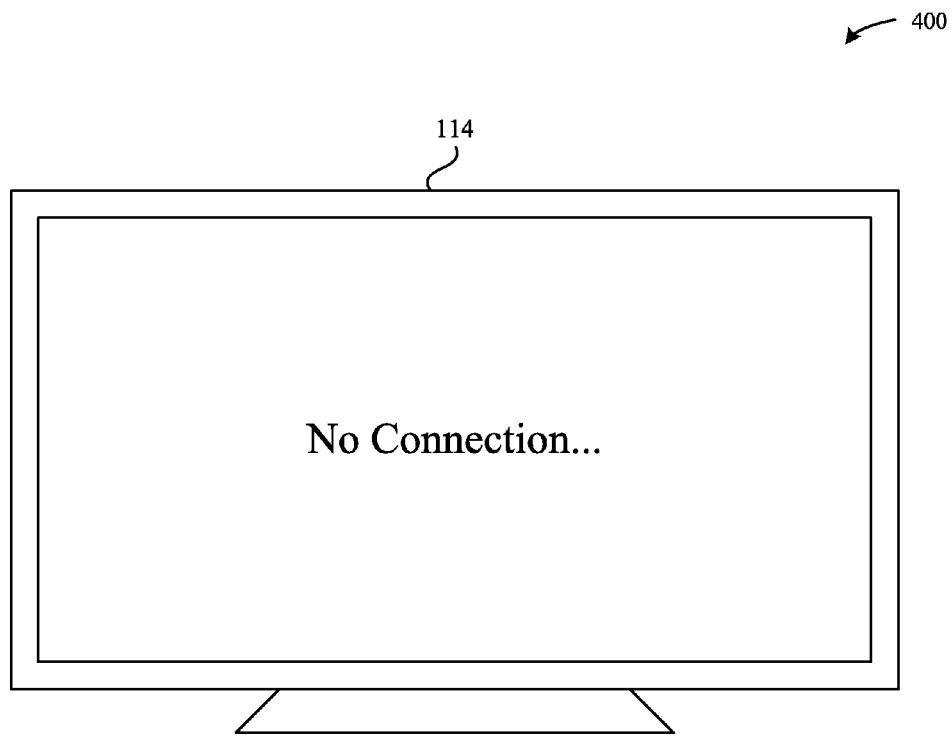
FIGS. 4A-4F illustrate conceptual diagrams of selectively broadcasting content to a display device, according to one embodiment.
Figure 4A:
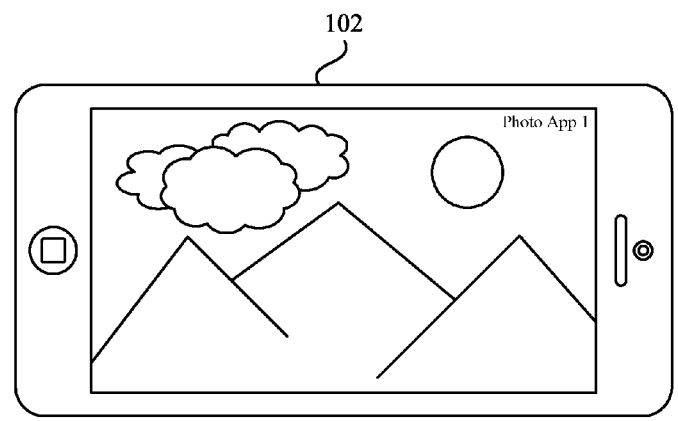
Figure 4B:
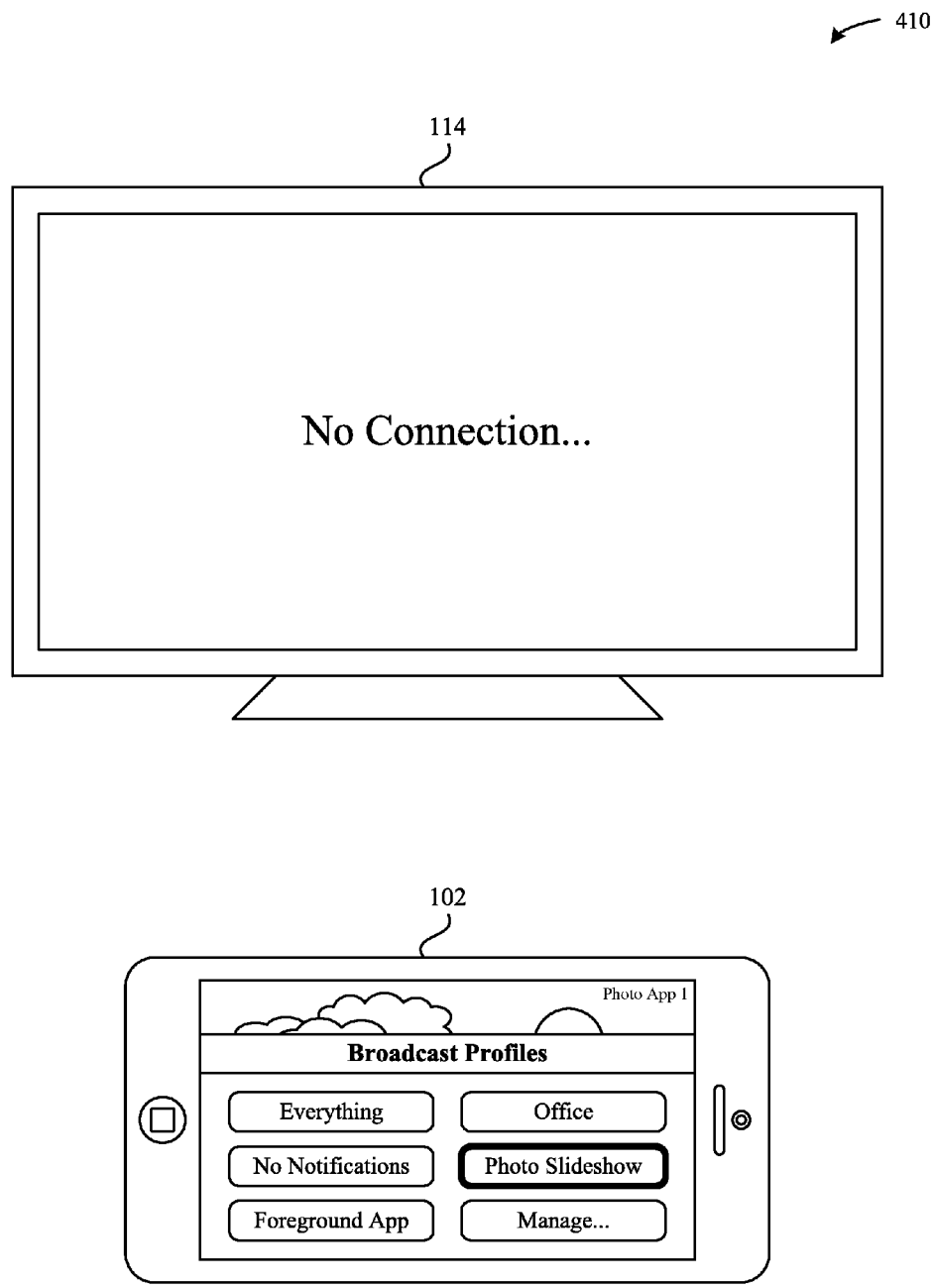
Figure 4C:
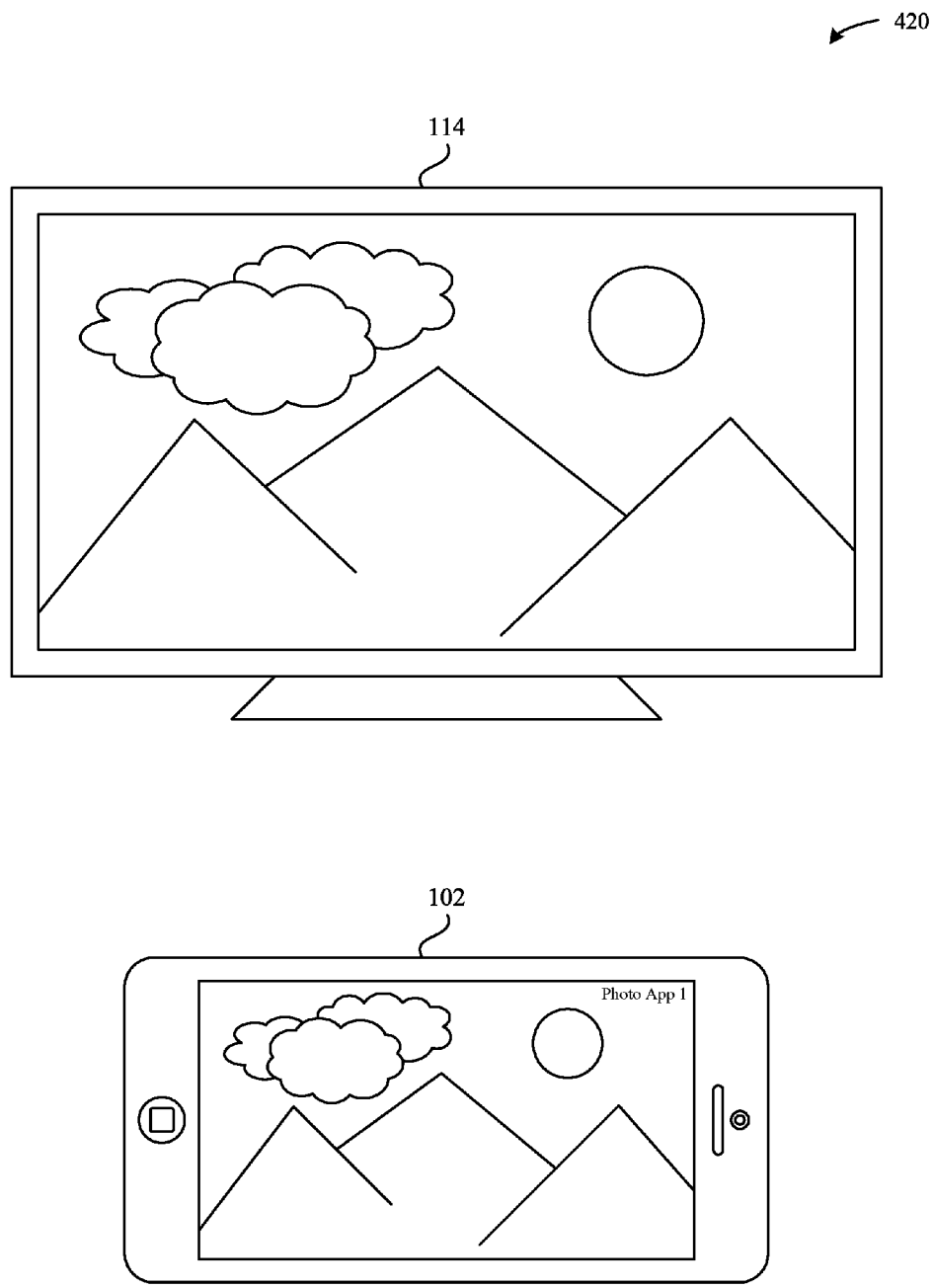

FIGS. 4A-4F illustrate conceptual diagrams of the client device 102 of FIGS. 1A-1B being configured to selectively broadcast content to the display device 114 of FIG. 1A, according to one embodiment. In particular, FIG. 4A illustrates a first step 400, where the client device 102 is not configured to broadcast content to the display device 114, but is configured to locally display media content generated by the "Photo App 1" application described above in conjunction with FIG. 3. FIG. 4B illustrates a second step 410, where the broadcast service 108 executing on the client device 102 receives a request to broadcast content to the display device 114. Again, this request can be generated automatically, e.g., when a broadcast profile 204 includes a trigger that is directed toward detecting a connectivity presence to the display device 114. Alternatively, this request can be generated manually by a user, e.g., when the user performs an input to the client device 102 indicating that he or she would like to broadcast content to the display device 114.

As shown in FIG. 4B, the broadcast service 108, in response to receiving the request to broadcast content, displays a prioritized listing of broadcast profiles 204 from which the user can perform a selection. In response, and according to the example illustrated in FIG. 2B, the user selects the broadcast profile 204 associated with the name "Photo Slideshow", which represents the broadcast profile 204 generated by way of the example illustrated in FIG. 3. Accordingly, the "Photo Slideshow" broadcast profile 204, when applied by the broadcast service 108, is configured to cause the client device 102 to broadcast only the content generated by the "Photo App 1" application and the "Photo App 2" application, and to prevent any other content generated at the client device 102 from being broadcasted. In turn, an as illustrated FIG. 4C by step 420, the broadcast service 108 causes the media content to be displayed at both the client device 102 and the display device 114.

Figure 4D:
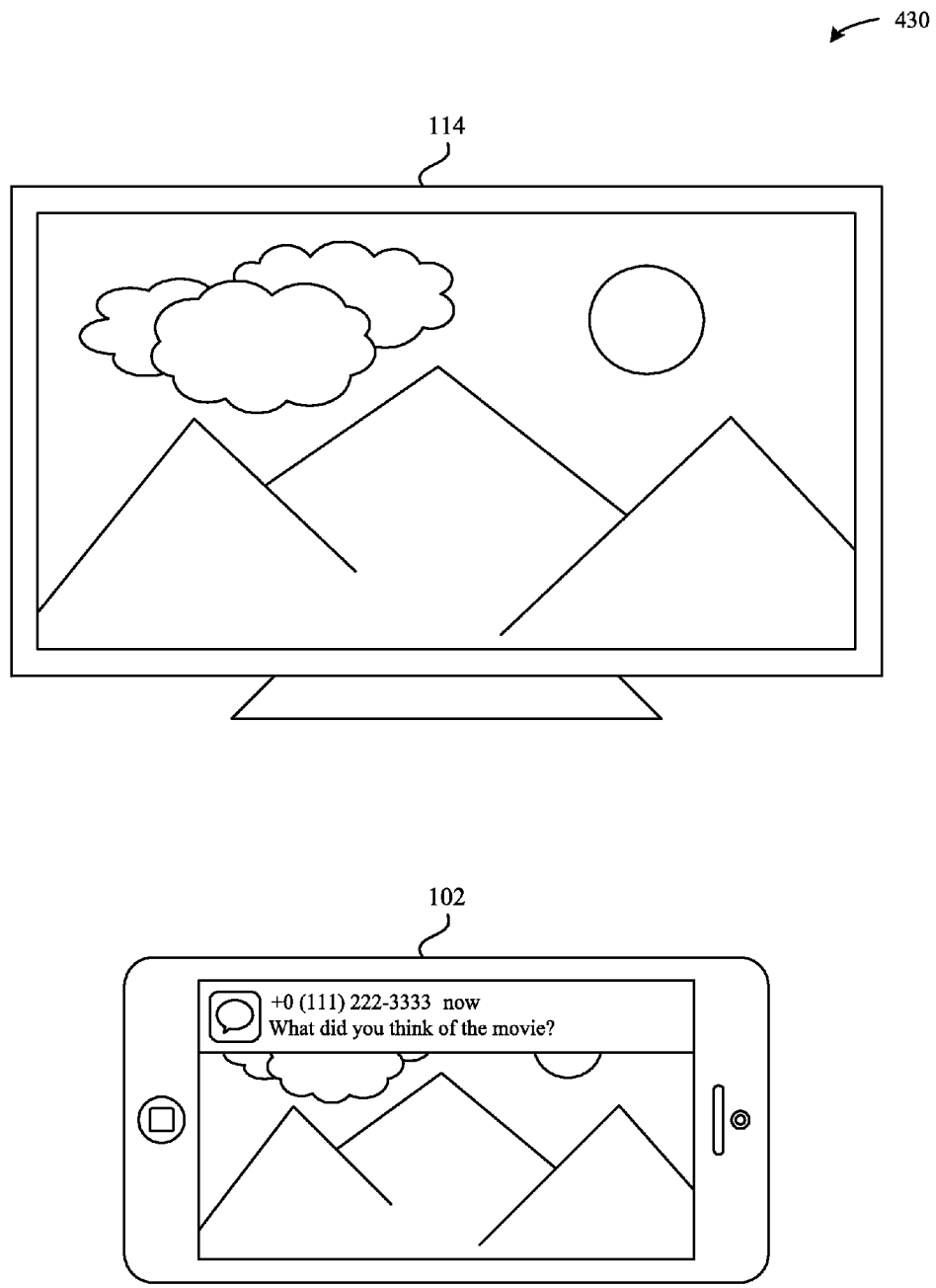

FIG. 4D illustrates a step 430 that involves the client device 102 receiving a new text message notification (e.g., via a text-messaging application executing on the client device 102). In turn, the client device 102 displays the new text message notification locally at the client device 102, thereby enabling the user to view the text message. However, the broadcast service 108, based on the "Photo Slideshow" broadcast profile 204—which, again, is configured to disregard content generated by any application other than the "Photo App 1" application and the "Photo App 2" application—chooses to ignore the content generated by the text-messaging application. More specifically, the broadcast service 108 does not broadcast content to the display device 114 that would otherwise cause the text message notification to be displayed at the display device 114. Accordingly, the user's privacy of and accessibility to personal content are maintained since the text message notification is displayed at the client device 102 (for the user to view) but is not displayed at the display device 114 (for others to view).

Figure 4E:
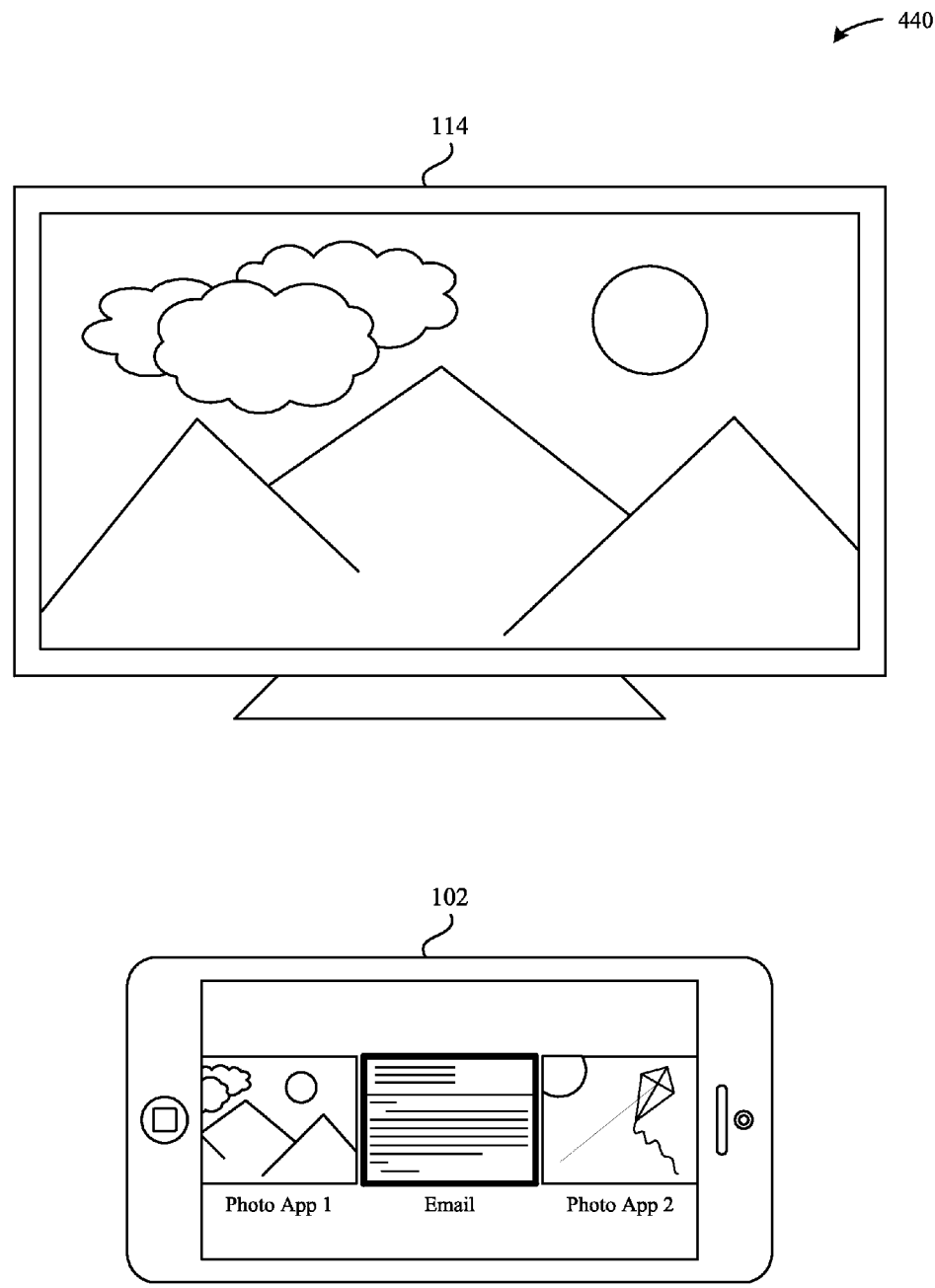
Figure 4F:
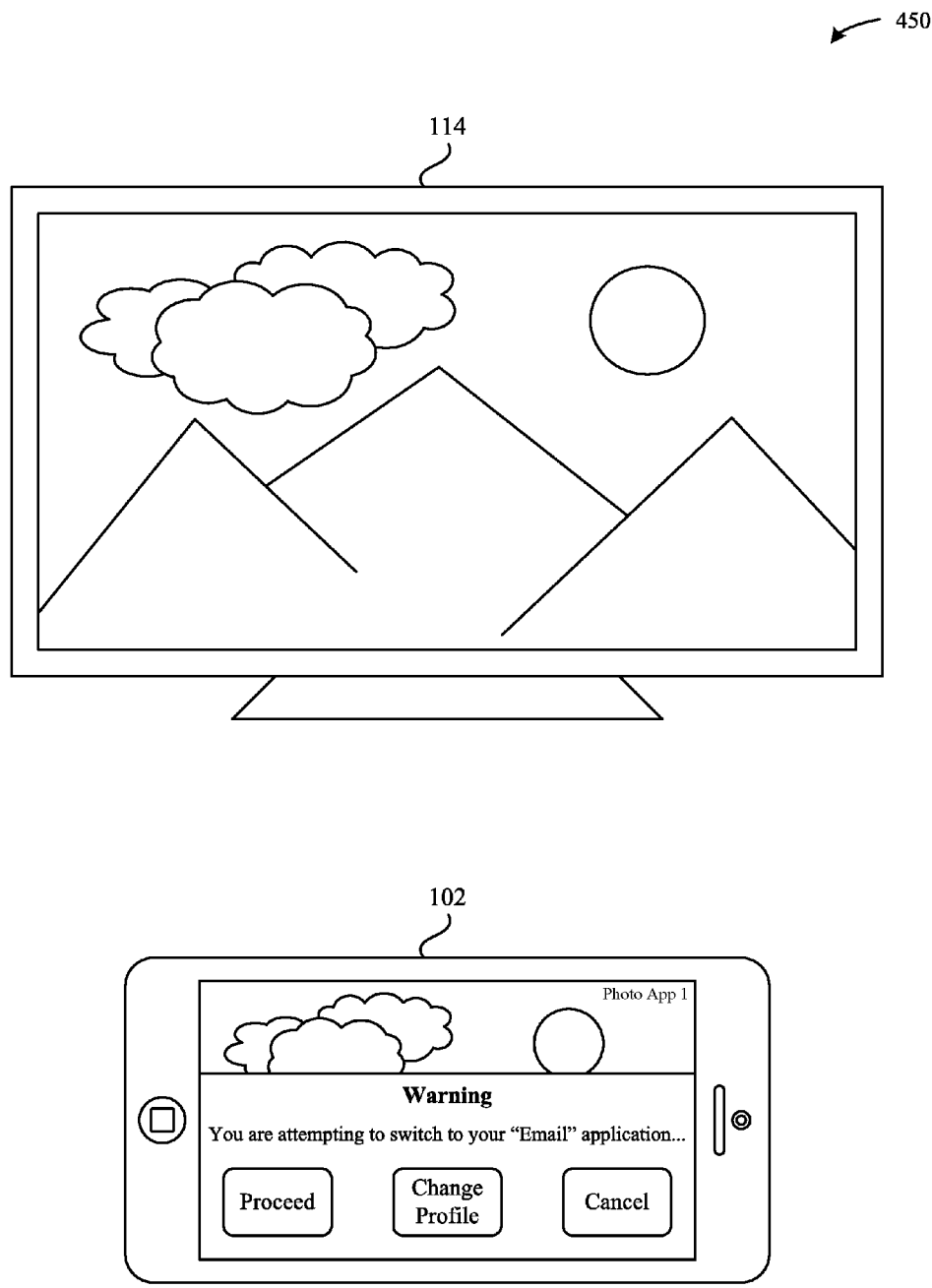
Figure 5A:
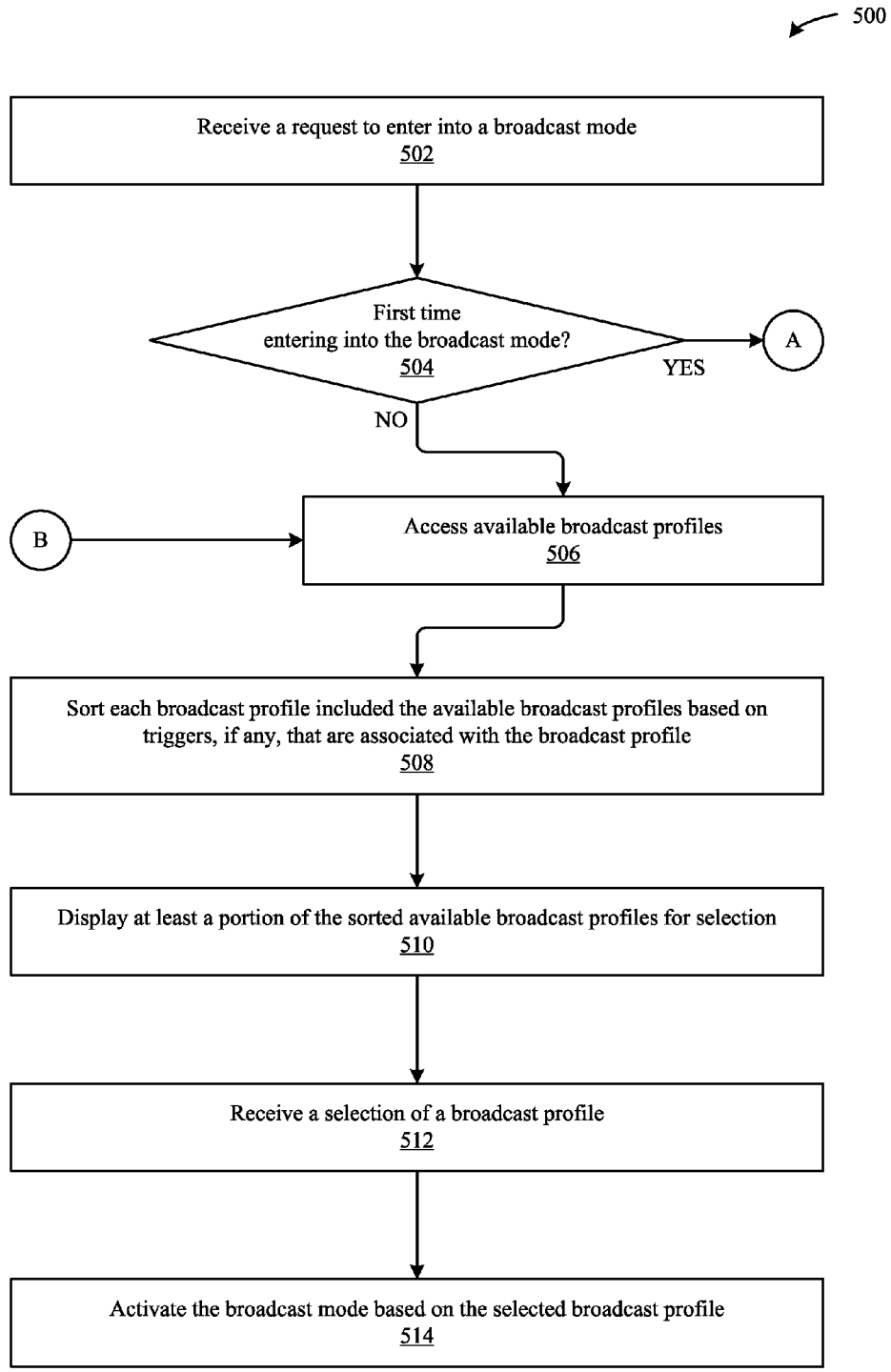
FIGS. 5A-5B illustrates a method for managing one or more broadcast profiles, according to one embodiment.
Figure 5B:
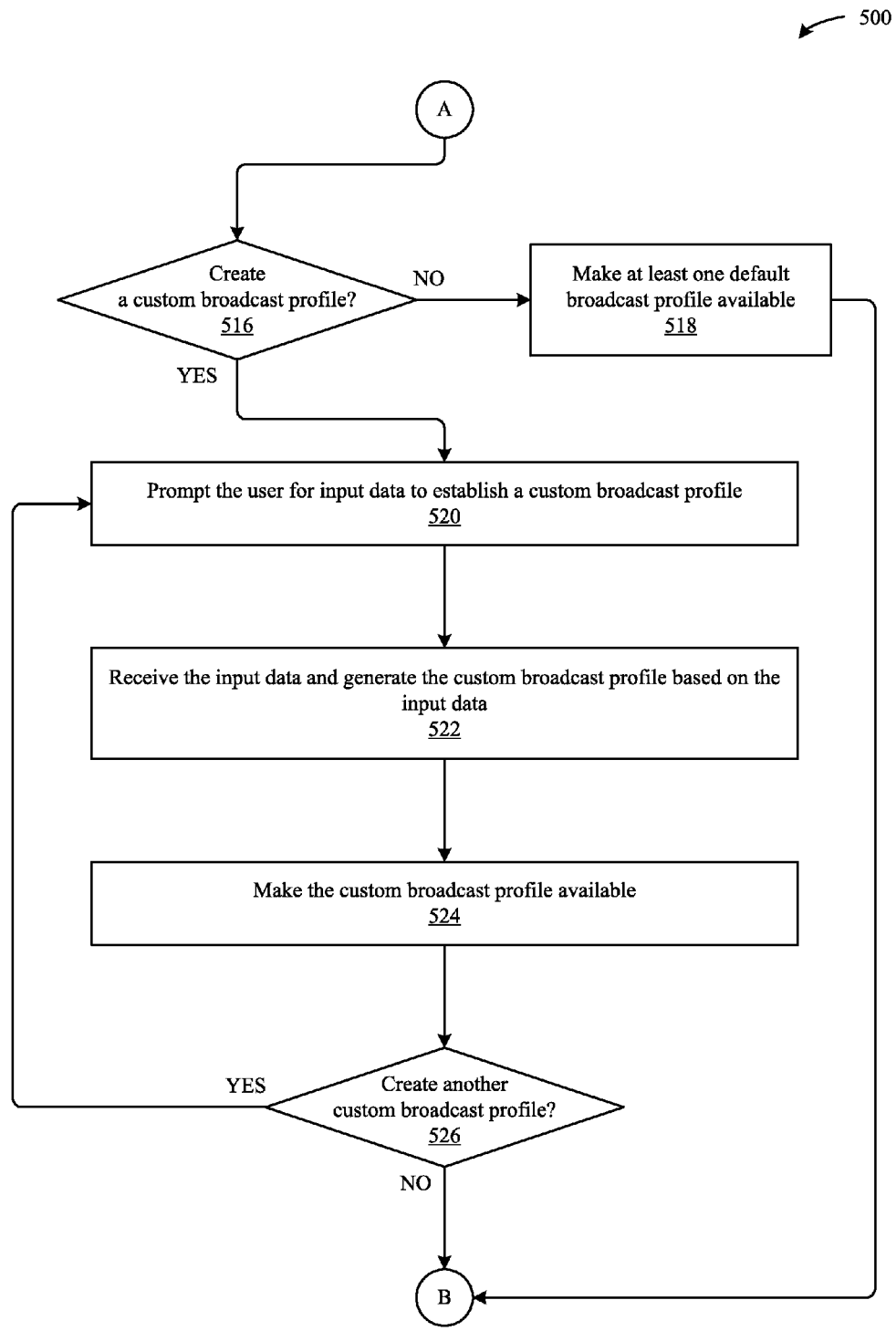

FIG. 4E illustrates a step 440 that involves the user attempting to switch to an "Email" application executing on the client device 102. Notably, because the "Photo Slideshow" broadcast profile 204 specifies that the user should be warned when switching to an application other than the "Photo App 1" application and the "Photo App 2" application (as established in FIG. 3), the broadcast service 108 responds by displaying a warning message to the user. An example of this warning message is illustrated by step 450 of FIG. 4E, and involves prompting the user to determine whether he or she would like to switch to the "Email" application, switch to a different broadcast profile 204, or cancel the switch entirely.

FIG. 5 illustrates a method 500 for managing one or more broadcast profiles, according to one embodiment. As shown, the method 500 begins at step 502, where the broadcast service 108 receives a request to enter into a broadcast mode. At step 504, the broadcast service 108 determines whether a previous request has been received to enter into the broadcast mode (i.e., if this is the first time broadcasting content). If, at step 504, the broadcast service 108 determines that it is the first time entering into the broadcast mode, then the method 500 proceeds to step 516. Otherwise, the method 500 proceeds to step 506, which is described below in greater detail.

At step 516, the broadcast service 108 determines whether a user of the client device 102 desires to create a custom broadcast profile 204. If, at step 516, the broadcast service 108 determines that the user desires to create a custom broadcast profile 204, then the method 500 proceeds to step 520. Otherwise, the method 500 proceeds to step 518, where the broadcast service 108 makes at least one default broadcast profile 204 available (e.g., the default broadcast profiles illustrated in FIG. 3).

At step 520, the broadcast service 108 prompts the user for input data to establish a custom broadcast profile 204, e.g., as described above in conjunction with FIG. 3. At step 522, the broadcast service 108 receives the input data and generates the custom broadcast profile 204 based on the input data. At step 524, the broadcast service 108 makes the custom broadcast profile 204 available. At step 526, the broadcast service 108 determines whether the user desires to create another custom broadcast profile 204. If, at step 526, the broadcast service 108 determines that the user desires to create another custom broadcast profile 204, then the method 500 proceeds back to step 520. Otherwise, the method 500 proceeds to step 506 of FIG. 5A.

At step 506, the broadcast service 108 accesses the available broadcast profiles 204. At step 508, the broadcast service 108 sorts the available broadcast profiles 204 based on triggers, if any, that are associated with the broadcast profile 204. At step 510, the broadcast service 108 displays at least a portion of the sorted available broadcast profiles 204 for selection. At step 512, the broadcast service 108 receives a selection of a broadcast profile 204. Again, this selection can occur via manual input made by the user, or automatically via triggers included in the available broadcast profiles 204. At step 514, the broadcast service 108 activates the broadcast mode based on the selected broadcast profile 204.

Figure 6:
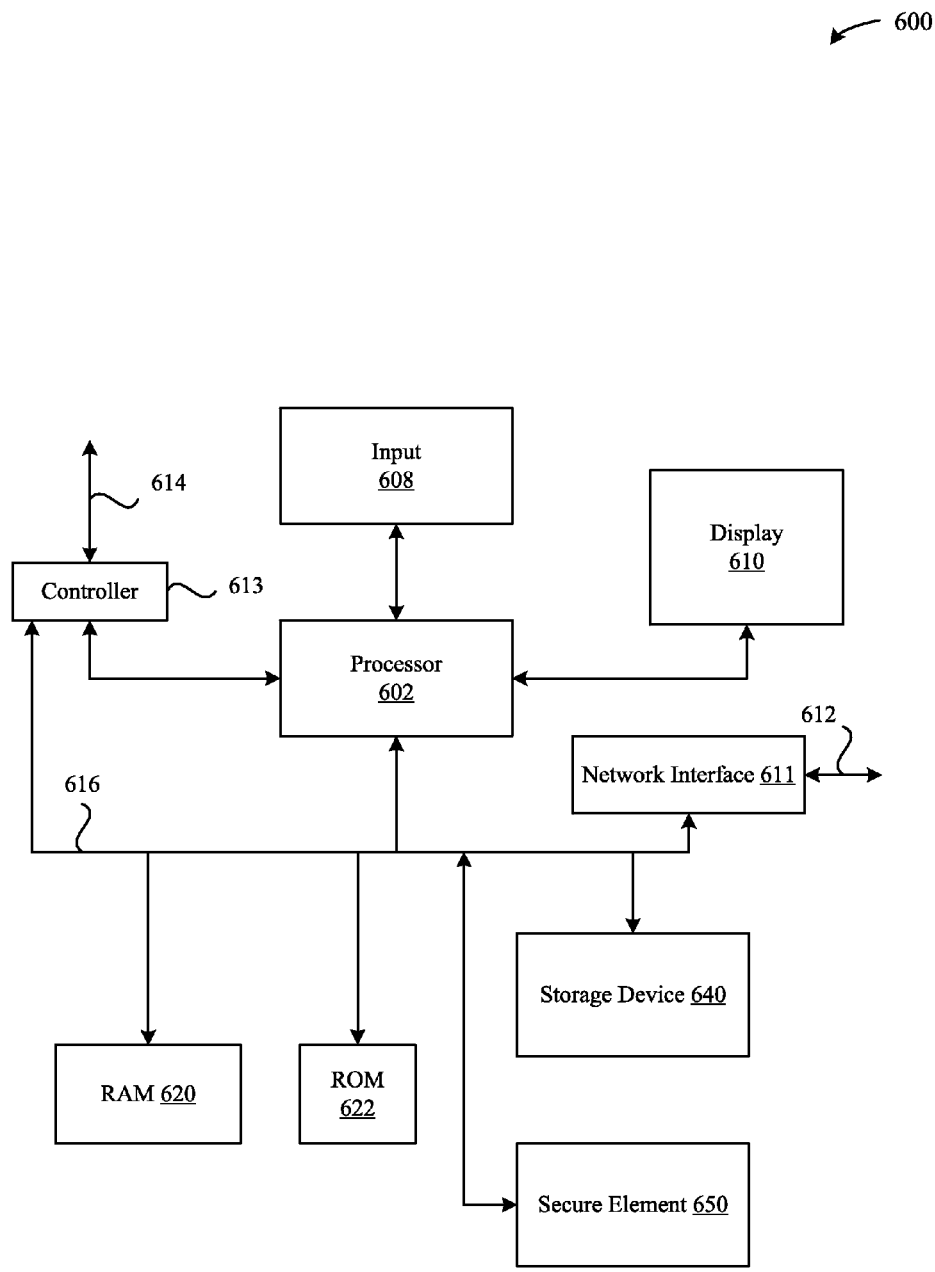
FIG. 6 illustrates a detailed view of a computing device that can be used to implement the various components described herein, according to some embodiments.

FIG. 6 illustrates a detailed view of a computing device 600 that can be used to implement the various components described herein, according to some embodiments. In particular, the detailed view illustrates various components that can be included in the client device 102 illustrated in FIG. 1. As shown in FIG. 6, the computing device 600 can include a processor 602 that represents a microprocessor or controller for controlling the overall operation of the computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Still further, the computing device 600 can include a display 610 (screen display) that can be controlled by the processor 602 to display information to the user. A data bus 616 can facilitate data transfer between at least a storage device 640, the processor 602, and a controller 613. The controller 613 can be used to interface with and control different equipment through and equipment control bus 614. The computing device 600 can also include a network/bus interface 611 that couples to a data link 612, where the network/bus interface 611 can be used, for example, to transmit the network packets 120 illustrated in FIG. 1A. In the case of a wireless connection, the network/bus interface 611 can include a wireless transceiver.

As noted above, the computing device 600 also include the storage device 640, which can comprise a single disk or a plurality of disks (e.g., hard drives), and includes a storage management module that manages one or more partitions within the storage device 640. In some embodiments, storage device 640 can include flash memory, semiconductor (solid state) memory or the like. The computing device 600 can also include a Random Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of applications executing on the client device 102, e.g., the operating system 104, as well as the client applications 106, the broadcast service 108, the location service 110, and the calendar service 112.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for selectively broadcasting content from a source device to a destination device, the method comprising:
at the source device:
executing an operating system (OS), wherein the OS is configured to:
generate an OS user interface (UI), and
execute a plurality of applications, wherein each application of the plurality of applications is configured to generate a respective application UI;
in response to a request to broadcast the OS UI to the destination device:
displaying a plurality of broadcast profiles that can be selected by a user, wherein each broadcast profile of the plurality of broadcast profiles is prioritized based on one or more triggers, if any, that are included in the broadcast profile and in an active state;
receiving a selection of a broadcast profile, wherein the broadcast profile identifies at least one application of the plurality of applications whose respective application UI should not be displayed at the destination device; and
in response to receiving the selection, updating a configuration of the source device to cause:
the OS UI, but not the respective application UI associated with the at least one application, to be broadcasted to the destination device, and
the OS UI, as well as the respective application UI associated with the at least one application, to be displayed at the source device.

2. The method of claim 1, wherein the at least one application is a notifications application that is configured to display notifications via the respective application UI associated with the at least one application.

3. The method of claim 1, further comprising:
detecting an attempt to transition to displaying a third UI of a particular application that, based on the broadcast profile, should not be broadcasted to the destination device; and
in response to detecting:
displaying a warning message, wherein the warning message enables the user to:
transition to displaying the third UI associated with the particular application;
select and apply a different broadcast profile, or
cancel the attempt.

4. The method of claim 1, wherein the broadcast profile defines, for each application of the plurality of applications, whether audio generated by the application is to be broadcasted to the destination device.

5. The method of claim 1, wherein each trigger is in the active state if, at a time the request is received, the source device:
is located within a particular geographical area associated with the trigger,
detects a connectivity presence of the destination device, and/or
identifies a particular calendar entry, wherein:
a calendar category applied to the particular calendar entry corresponds to a calendar category associated with the trigger, and
a timespan applied to the particular calendar entry overlaps the time at which the request is received.

6. The method of claim 1, wherein the destination device is a display device or a set top box that is configured to interface with a separate display device.

7. A non-transitory computer readable storage medium configured to store instructions that, when executed by a processor included in a computing device, cause the computing device to:
generate a first user interface (UI) and a second UI, wherein the second UI is displayed within the first UI;
in response to a request to broadcast the first UI to a destination device:
display a plurality of broadcast profiles that can be selected by a user, wherein each broadcast profile of the plurality of broadcast profiles is prioritized based on one or more triggers, if any, that are included in the broadcast profile and in an active state;
receive a selection of a broadcast profile that defines a manner in which the second UI is to be broadcasted to the destination device; and
based on the broadcast profile:
display, at the computing device, both the first UI and the second UI, and
broadcast, to the destination device, only the first UI.

8. The non-transitory computer readable storage medium of claim 7, wherein the first UI is associated with an operating system (OS) and the second UI is associated with a notifications application executed by the OS.

9. The non-transitory computer readable storage medium of claim 8, wherein the second UI comprises video data and audio data that is produced by the notifications application.

10. The non-transitory computer readable storage medium of claim 8, further comprising:
detecting an attempt to transition to displaying a third UI associated with an auxiliary application executed by the OS, wherein, based on the broadcast profile, the third UI should not be broadcasted to the destination device; and
in response to detecting:
displaying a warning message, wherein the warning message enables the user to select from one of the following:
transition to displaying the third UI associated with the auxiliary application;
select and apply a different broadcast profile, or
cancel the attempt.

11. The non-transitory computer readable storage medium of claim 7, wherein each trigger is in the active state if, at a time the request is received, the computing device:
is located within a particular geographical area associated with the trigger,
detects a connectivity presence of the destination device, and/or
identifies a particular calendar entry, wherein:
a calendar category applied to the particular calendar entry corresponds to a calendar category associated with the trigger, and
a timespan applied to the particular calendar entry overlaps the time at which the request is received.

12. The non-transitory computer readable storage medium of claim 7, wherein the destination device is a display device or a set top box that is configured to interface with a separate display device.

13. A system configured to selectively broadcast content to a destination device, comprising:
 a processor; and
 a memory, wherein the memory is configured to store instructions that, when executed by the processor, cause the system to:
  generate a first user interface (UI) and a second UI, wherein the second UI is displayed within the first UI;
  in response to a request to broadcast the first UI to the destination device:
   display a plurality of broadcast profiles that can be selected by a user, wherein each broadcast profile of the plurality of broadcast profiles is prioritized based on one or more triggers, if any, that are included in the broadcast profile and in an active state;
   receive a selection of a broadcast profile that defines a manner in which the second UI is to be broadcasted to the destination device; and
   based on the broadcast profile:
    display, at the system, both the first UI and the second UI, and
    broadcast, to the destination device, only the first UI.

14. The system of claim 13, wherein each trigger is in the active state if, at a time the request is received, the system:
 is located within a particular geographical area associated with the trigger,
 detects a connectivity presence of the destination device, and/or
 identifies a particular calendar entry, wherein:
  a calendar category applied to the particular calendar entry corresponds to a calendar category associated with the trigger, and
  a timespan applied to the particular calendar entry overlaps the time at which the request is received.

* * * * *